June 28, 1960 J. F. JOY 2,942,863
TUNNEL BORING MACHINE HAVING FLEXIBLE BELT SHAKER CONVEYOR
Original Filed June 30, 1952 7 Sheets-Sheet 1

Inventor:
Joseph F. Joy
by Charles F. Osgood,
Attorney.

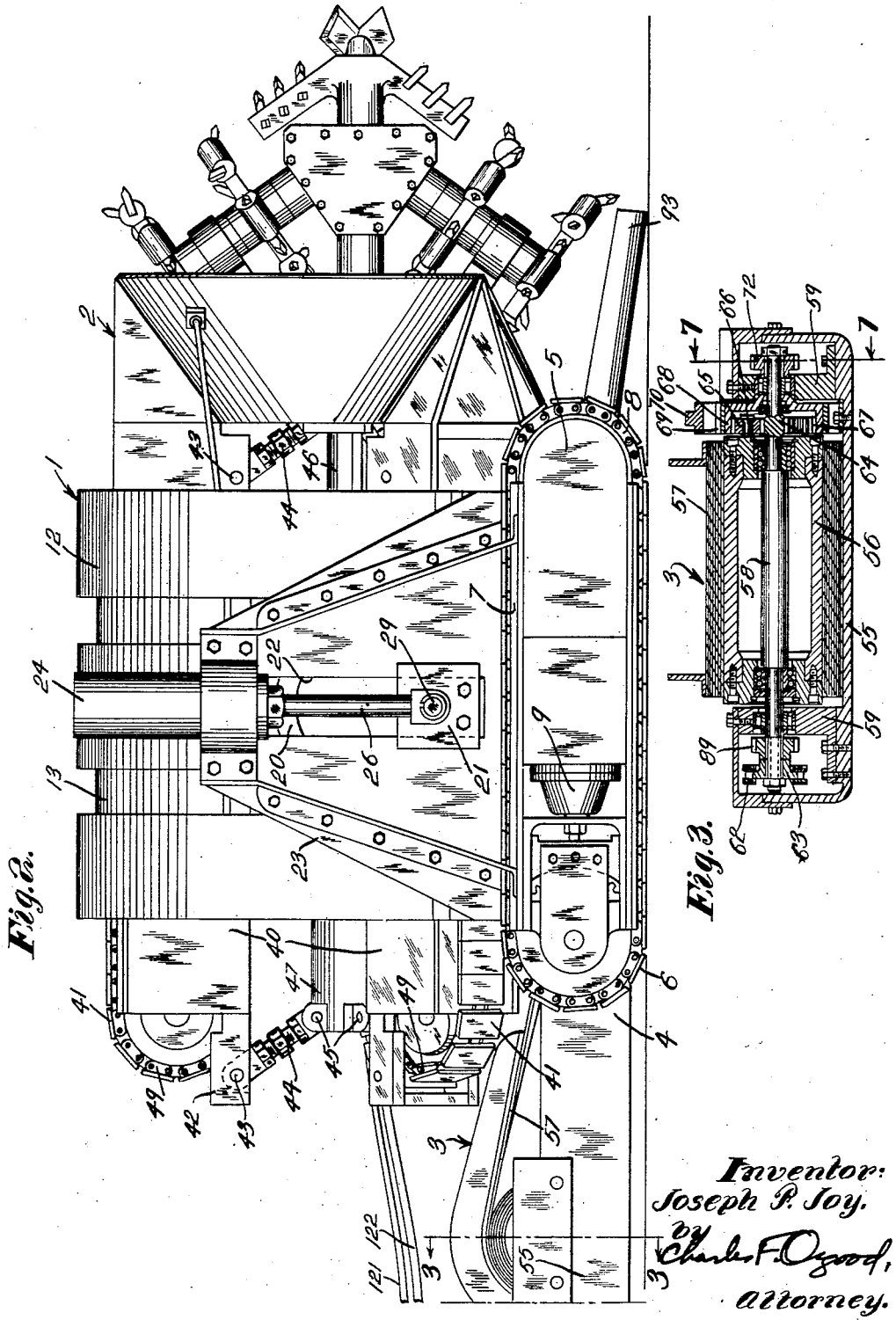

June 28, 1960  J. F. JOY  2,942,863
TUNNEL BORING MACHINE HAVING FLEXIBLE BELT SHAKER CONVEYOR
Original Filed June 30, 1952  7 Sheets-Sheet 3
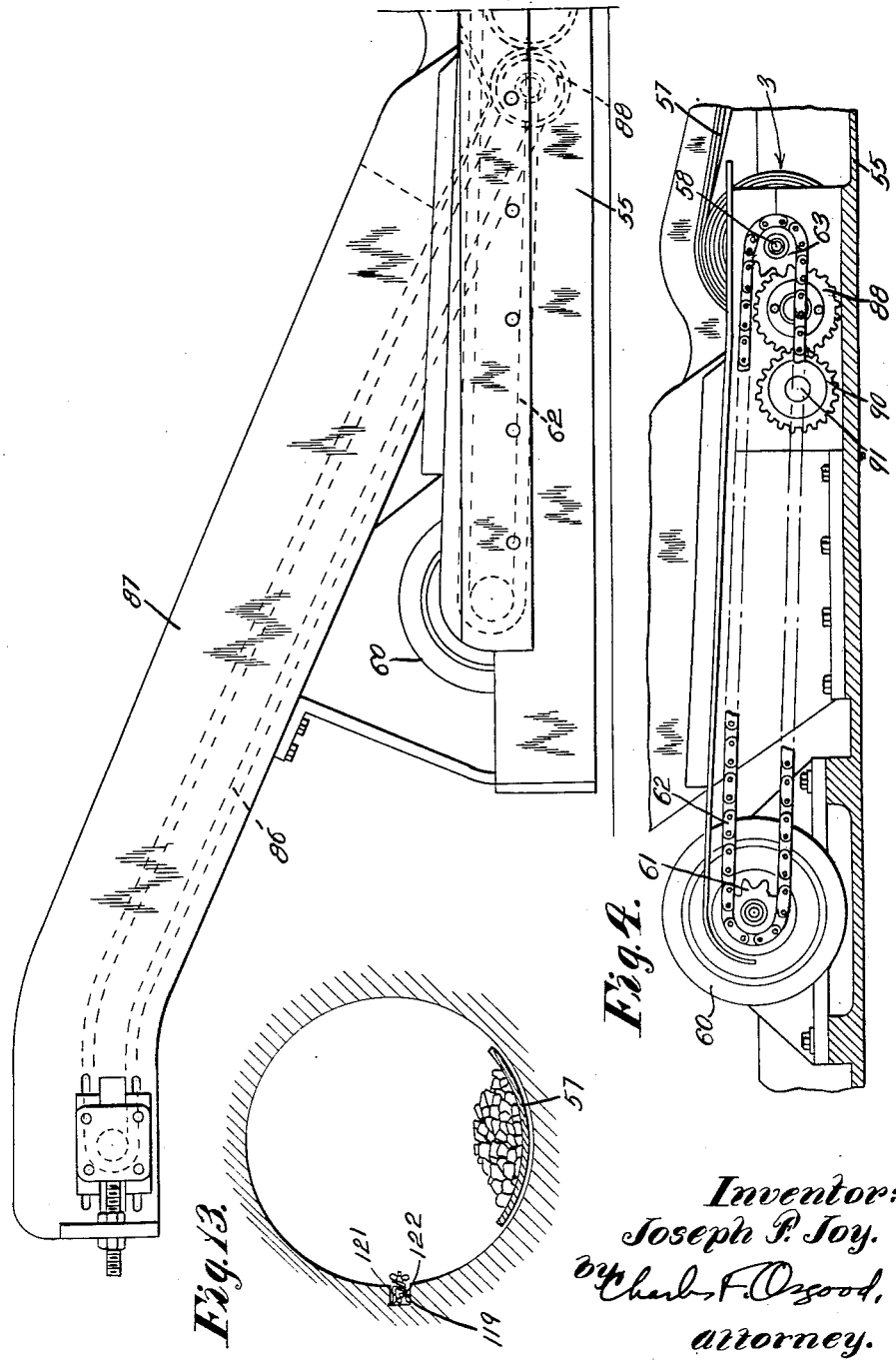

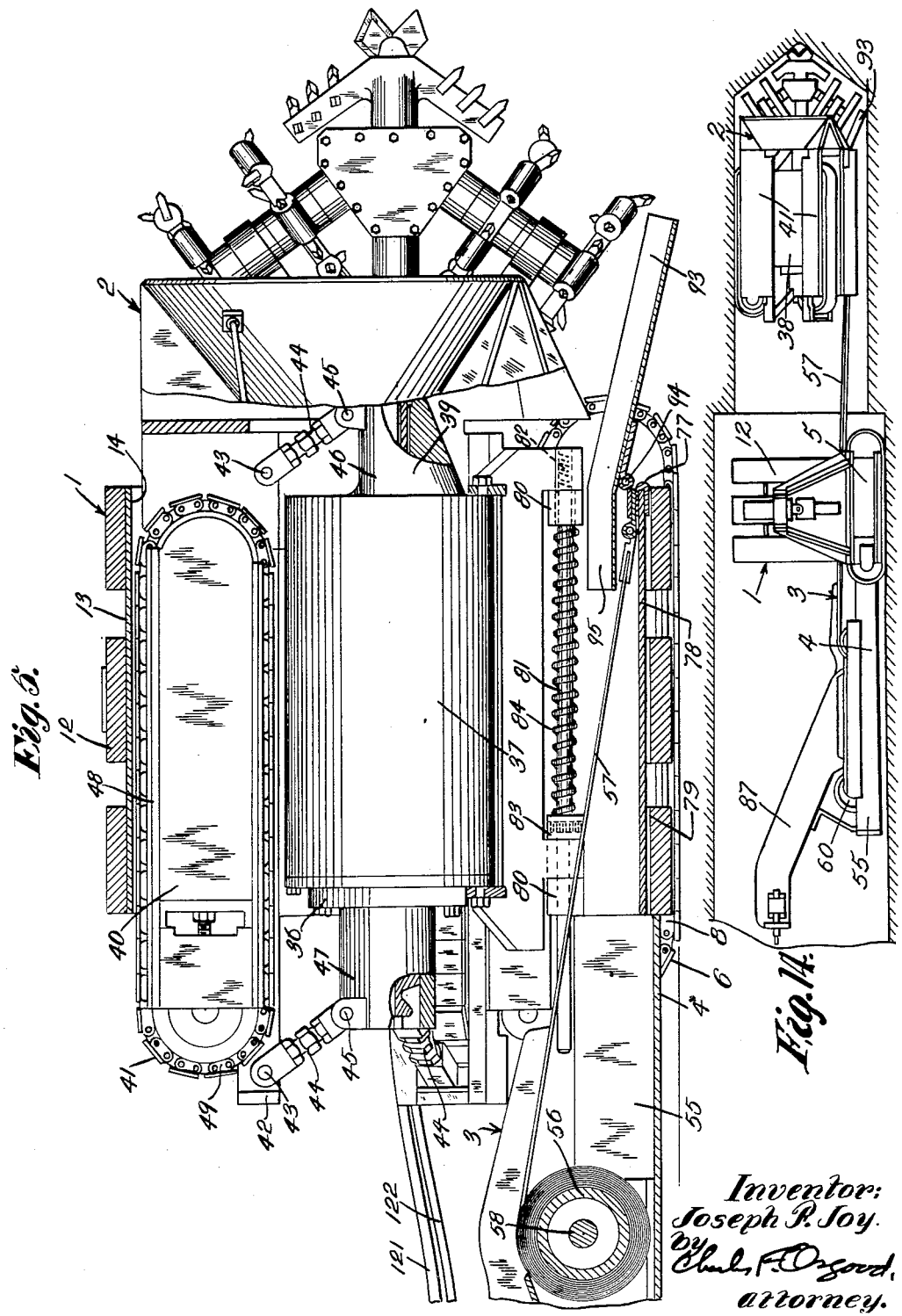

June 28, 1960 J. F. JOY 2,942,863
TUNNEL BORING MACHINE HAVING FLEXIBLE BELT SHAKER CONVEYOR
Original Filed June 30, 1952 7 Sheets-Sheet 5

Inventor:
Joseph P. Joy.
by Charles F. Osgood,
Attorney.

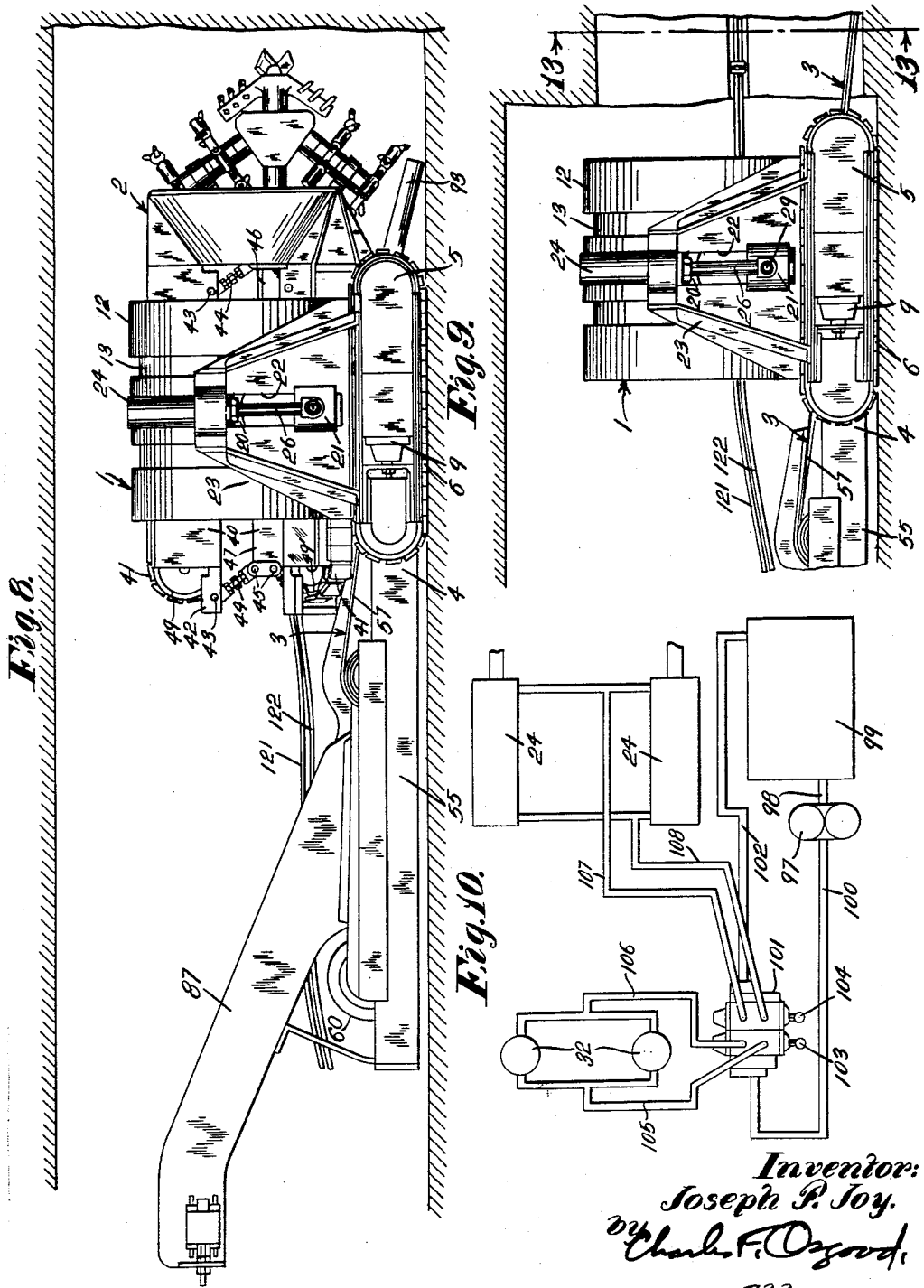

June 28, 1960   J. F. JOY   2,942,863
TUNNEL BORING MACHINE HAVING FLEXIBLE BELT SHAKER CONVEYOR
Original Filed June 30, 1952   7 Sheets-Sheet 7

Inventor:
Joseph F. Joy.
by Charles F. Osgood,
Attorney.

United States Patent Office 2,942,863
Patented June 28, 1960

2,942,863

TUNNEL BORING MACHINE HAVING FLEXIBLE BELT SHAKER CONVEYOR

Joseph F. Joy, Pittsburgh, Pa., assignor to Joy Manufacturing Company, Pittsburgh, Pa., a corporation of Pennsylvania Original application June 30, 1952, Ser. No. 296,324, now Patent No. 2,822,159, dated Feb. 4, 1958. Divided and this application Sept. 1, 1954, Ser. No. 453,467

1 Claim. (Cl. 262—7)

This invention relates to mining apparatus and more particularly to a boring machine of the type known as a "Bore Miner" for forming bores in an earth formation such as a coal seam of an underground coal mine, together with improved conveying means associated with the machine.

This application is a division of my copending application Serial No. 296,324, filed June 30, 1952, now Patent No. 2,822,159.

It is an object of the present invention to provide an improved mining apparatus. Another object is to provide an improved shaft or tunnel boring apparatus having novel features of construction whereby bores may be rapidly and effectively formed in a mine vein or other earth formation. Another object is to provide an improved carriage or launching device for the boring machine whereby the latter may be readily transported from place to place and adequately supported and guided during the initial pentrating movement of the boring machine into the mine vein or other earth formation. Yet another object is to provide an improved extensible conveying means associated with the boring machine and its launching carriage. These and other objects and advantages of the invention will, however, hereinafter more fully appear.

In the accompanying drawings there is shown for purposes of illustration one form which the invention may assume in practice.

In these drawings:

Fig. 1 is a plan view of the improved boring machine, its transport and guide carriage, and the associated conveying means.

Figs. 2 and 2a, taken together, constitute a side elevational view of the apparatus shown in Fig. 1.

Fig. 3 is a cross sectional view, taken on line 3—3 of Fig. 2, illustrating a portion of the drive mechanism for the conveyor.

Fig. 4 is a fragmentary longitudinal vertical section illustrating details of the drive for the conveyor.

Fig. 5 is a view in central longitudinal vertical section, taken on line 5—5 of Fig. 1, with parts in full.

Fig. 8 is a somewhat schematic view showing the apparatus in an operating position in a mine with the boring machine in its launching position on the carriage.

Fig. 9 is a fragmentary view similar to Fig. 8, showing the launching carriage with the boring machine removed therefrom.

Fig. 10 is a diagrammatic view illustrating the hydraulic fluid system.

Fig. 13 is a cross section, taken on line 13—13 of Fig. 9, showing the shaker belt of the conveyor resting on the bore-bottom.

Fig. 14 is a schematic view showing the mining machine in an advanced position with respect to the launching carriage.

Figure 1:
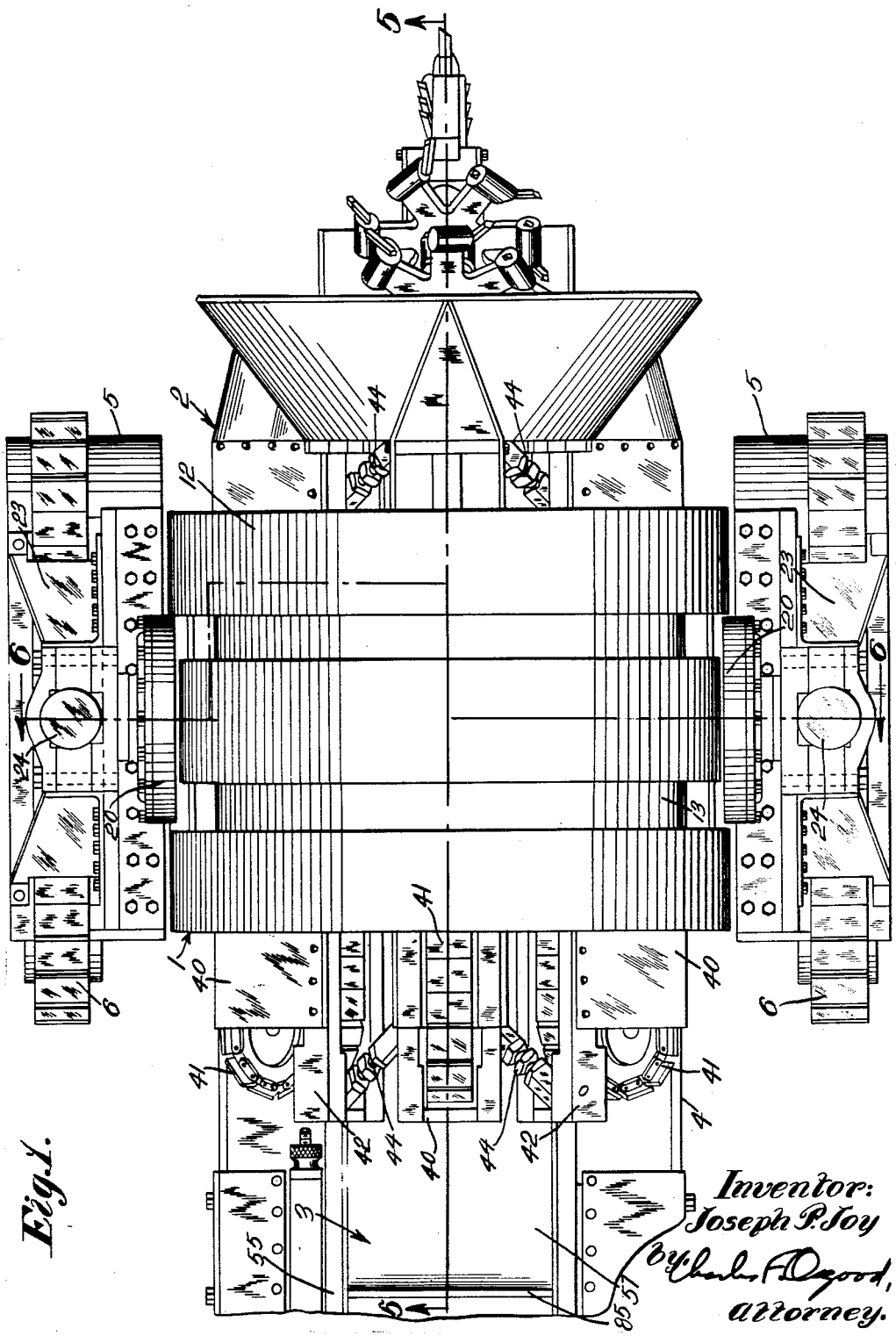

In the illustrative embodiment of the invention, as shown in the drawings, a self-propelled launching carriage or truck is generally designated 1 and this carriage receives a unitary boring machine generally designated 2, and associated with and extending between the carriage 1 and boring machine 2 is a conveying means generally designated 3, which may be of the kind known as a shaker belt generally similar to that disclosed in my copending application Serial No. 20,252, filed April 10, 1948, now Patent No. 2,713,414. Evidently, the boring machine may be associated with conveying means of other types.

Figure 6:
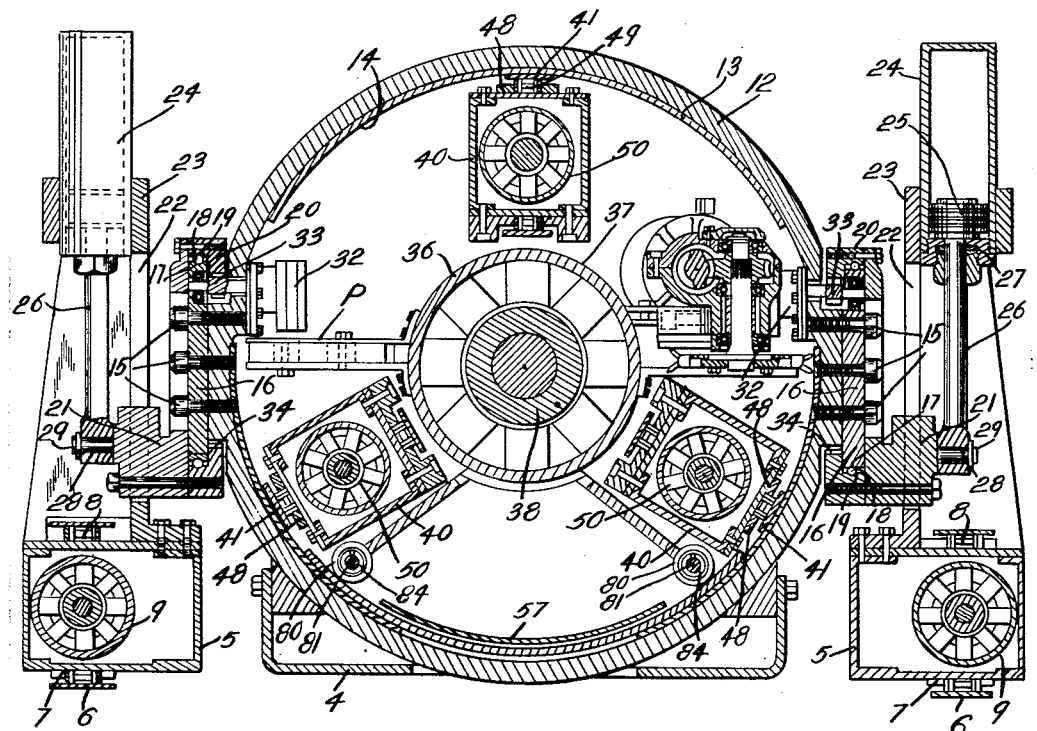
Fig. 6 is a cross sectional view, taken in the planes of line 6—6 of Fig. 1.

The self-propelled launching carriage or truck 1 comprises a frame 4 adjustably mounted on side frames 5 of propelling and steering devices herein desirably in the form of endless crawler treads 6. The side frames 5 have usual guideways 7 along which endless tread chains 8 are guided for orbital circulation, and the tread chains are driven by individual motors 9 (Figs. 2 and 6) enclosed within the tread side frames. The motors 9 drive the tread chains in the manner of the tread drives of the boring machine as described in the copending application, and the motors are desirably reversible and may be independently controlled to effect drive of the crawler treads in either of opposite directions and to drive one tread at a speed different from the speed of the other to effect steering of the carriage, in a well-known manner. The carriage frame 4 includes an upstanding supporting and guiding frame 12 of generally circular cross section, as shown in Fig. 6, and fitted within this annular frame is a shell 13 providing an internal cylindrical bore or guiding surface 14 for receiving the boring machine 2, in a manner to be later described.

In this improved construction the circular frame or annulus 12 is secured at its sides, as by screws 15, to circular bearing plates 16 having peripheral grooves providing raceways 17 for ball bearings 18, the latter being guided in internal raceways 19 on annular bearing supports 20 carried by vertical guide blocks or slides 21. The guide blocks are mounted for vertical adjustment along vertical guideways 22 provided by upstanding frames or brackets 23 mounted at the tops of the side frames 5 of the carriage, as shown in Fig. 6. Carried at the upper portion of the brackets 23 are vertical fluid cylinders 24 containing reciprocable pistons 25 having piston rods 26 extending downwardly through the packed bottom heads 27 of the cylinders. These piston rods are pivotally connected at their lower ends at 28 to transverse pivot portions or trunnions 29 projecting outwardly from the sides of the vertical guide blocks 21. By properly supplying fluid under pressure to the vertical cylinders 24, the pistons 25 may be moved to effect raising or lowering of the annular guide frame 12 of the carriage with respect to the crawler treads 6 to vary the launching height, and by trapping fluid in the cylinders the annular frame 12 may be locked in adjusted position. The carriage guide frame 12 may be rocked in vertical planes on its bearing mountings by means of reversible fluid motors 32 (Fig. 6) mounted at the inner sides of the frame 12 and driving spur pinions 33 meshing with internal gears 34 integral with the adjacent bearing annuli or supports 20, as shown in Fig. 6. Thus, by properly operating the motors 32 the annular guide frame 12 may be tilted in vertical planes between a substantially horizontal position and a vertical position for a purpose to be later described, and by trapping fluid or otherwise locking the motors 32 the annular guide frame may be firmly held in adjusted position. Under certain conditions the motors 32 may be operated to swing the boring head to effect a swinging cut.

Now referring to detail structure of the boring machine 2, it will be noted that a central circular frame or body 36 (Figs. 5 and 6) comprises a housing 37 of a motor 38, and a front gear housing 39 secured to the motor-housing, and disposed generally radially of this central frame or body are longitudinally extending guide frames 40 for endless crawler treads 41. These tread frames are desirably spaced 120° apart with the upper crawler tread disposed at the vertical top center of the machine and with the bottom treads spaced 120° apart, 60° at each side of the vertical center, providing an open space for the conveying means 3 with the lower treads straddling the conveyor, as later explained. The tread frames 40 have inner frame portions 42 which are pivotally connected near their opposite ends at 43 to forwardly and inwardly inclined toggle links or arms 44, with the front arms arranged parallel to the rear arms. The arms 44 are pivotally supported at 45 on forward and rearward projections 46 and 47 of the central frame 36 of the machine. These tread frames provide guideways 48 along which endless tread chains 49 are guided for orbital circulation, and the tread chains are driven by motors 50 (Fig. 6), desirably electric motors, enclosed within the tread frames. The motors 50 are desirably reversible and may simultaneously effect drive of the crawler treads and in either of opposite directions, in a well-known manner.

Figure 7:
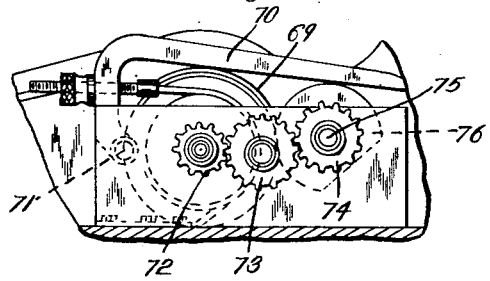
Fig. 7 is a fragmentary vertical section, taken on line 7—7 of Fig. 3.
Figure 11:
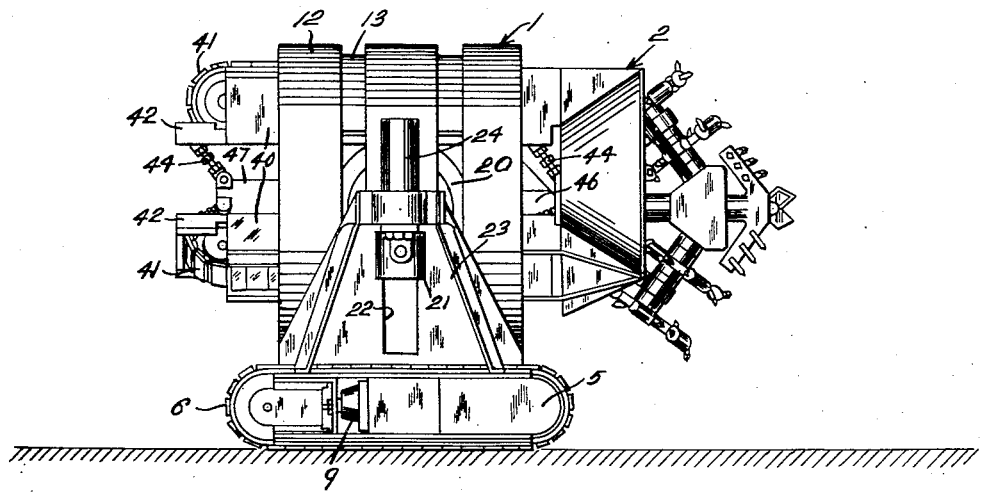
Fig. 11 is a schematic view showing the apparatus in a mine with the machine-guide of the carriage in elevated position.

Now referring to the conveying means 3, it will be noted that carried by the launching carriage 1 on the rearward portion 55 of the carriage frame 4 is belt storing means in the form of a winding drum 56 (Figs. 3 and 5) on which a flexible shaker belt 57 is wound. As mentioned above, this shaker belt conveyor may be similar to that disclosed in my copending application, Serial No. 20,252, now matured into Patent No. 2,713,414, dated July 19, 1955, and comprises a horizontal shaft 58 journaled in bearings supported by a frame 59 secured to the carriage frame. The drum 56 is journaled on bearings supported by the shaft 58, and the latter is driven by a motor 60, desirably an electric motor, carried by the carriage frame (Fig. 4), and this motor drives a sprocket 61 connected by an endless drive chain 62 to a sprocket 63 keyed to the shaft 58 (Fig. 3). Formed on the shaft 58 is a spur pinion 64 meshing with planet gears 65 journaled on stub shafts 66 integral with the drum frame. These planet gears mesh with an internal gear 67 formed on a rotatable reaction member 68 journaled on a bearing supported by the drum shaft. Cooperating with this reaction member is a brake band 69 operated by a lever 70 (Fig. 7) pivotally mounted at 71 on the adjacent end of the frame 59. Keyed to the shaft 58 is a spur gear 72 meshing with a spur gear 73 which in turn meshes with and drives a spur gear 74 secured to a transverse shaft 75 suitably journaled on the frame 59. Secured to this shaft is a cam 76 which engages the lever 70 to swing the latter back and forth about its pivot to effect intermittent application and release of the brake band 69. Thus, as the drum shaft 58 is driven the drum is intermittently driven in a direction tending to wind in the shaker belt on the drum. The forward end of the shaker belt is attached as by one or more hooks 77 (Fig. 5) to the front edge of a reciprocable frame 78 guided on the machine frame at 79 and providing an element of a reactor mechanism to be now described. The reciprocable reactor frame 78 has front and rear abutment lugs 80 which slide along parallel guide rods 81 secured at 82 to the frame and supported thereby. Arranged between collars 83 secured to the rods and the front abutment lugs 80 and encircling the rods are coil springs 84. As the shaker belt is wound in by the drum 56, the reactor frame 78 is slid rearwardly thereby compressing the coil springs 84 and when the drum 56 is disconnected from its drive, the coil springs suddenly move the conveyor belt forwardly.

As a result of this mechanism, the shaker belt may be reciprocated at a relatively low speed in the conveying direction and at relatively high speed in the opposite direction so that the disintegrated material received by the shaker belt is conveyed rearwardly of the machine. When the material on the shaker belt reaches the drum 56, it is deflected by a deflector plate 85 (Fig. 1) or otherwise onto an endless chain type discharge conveyor 86 which is guided for circulation along an upwardly and rearwardly inclined conveyor frame 87 mounted on the rearward portion 55 of the carriage frame (see Fig. 2a). This chain conveyor is driven by the motor 60 and the conveyor drive comprises a spur gear 88 (Fig. 4) meshing with and driven by a spur gear 89 (Fig. 3) keyed to the drum shaft 58. The gear 88 meshes with and drives a spur gear 90 secured to a transverse shaft 91 which is connected in driving relation with the chain conveyor 86 in a well-known manner. From the foregoing, it is evident that as the boring head operates to dislodge and disintegrate the mineral of the mine vein, the disintegrated mineral is discharged onto the shaker conveyor belt, is conveyed rearwardly of the machine by the shaker belt and is discharged onto the chain conveyor of the launching carriage which is located outside of the bore formed by the boring machine in the entry (as shown in Fig. 9). The rear discharge conveyor 86 may discharge the disintegrated material onto the conventional mine haulage system such as onto a shaker belt conveyor or into haulage cars likewise in a well-known manner.

As the boring machine advances in the bore, a reciprocable front nose piece 93 rides on the bore-bottom and directs the loose mineral from the bottom of the bore rearwardly and upwardly toward the front receiving end of the shaker belt, and this nose piece is desirably pivoted at 94 on the reciprocable reactor frame 78 to tilt in vertical planes. The forward portion of this nose piece is desirably curved to conform to the curvature of the curved bottom of the bore, and a rearward portion 95 extends rearwardly above the front receiving end of the shaker belt so that the loose material is directed onto the belt during its reciprocation, in the manner shown in Fig. 5. The flexible shaker belt 57 has its portion intermediate the boring machine and the launching carriage resting on the bore-bottom and the belt due to its flexibility conforms substantially to the curvature of the bore (see Fig. 13) so that the sides of the belt curve upwardly, thus providing a troughlike shape which retains the loose material on the belt as it is conveyed rearwardly from the machine through the bore.

The hydraulic fluid system, shown in Fig. 10, will now be described. A pump 97, which may be mounted in the gear housing 39 of the machine and be driven by the motor 38, has its suction side connected by a conduit 98 to a fluid tank 99 which may comprise the gear housing chamber and which may contain any suitable hydraulic fluid such as a light oil. The discharge side of the pump is connected by a conduit 100 to the pressure passage of a valve box 101 of a conventional control valve mechanism suitably mounted on the machine. Under suitable conditions, the control valve mechanism may be mounted on the launching carriage remote from the machine. The discharge passage of the valve box is connected by a return conduit 102 back to the tank 99. The valve box has parallel bores containing conventional control valves 103 and 104, each having a suitable operating handle. The bore containing the control valve 103 is connected by branched conduits 105 and 106 to the opposite sides of the reversible fluid motors 32 while the bore containing the control valve 104 is connected by branched conduits 107 and 108 to the opposite ends of the vertical fluid cylinders 24 for elevating the annular carriage frame 12. In the event the control valve mechanism is mounted on the launching carriage, the conduits 105 to 108 inclusive must extend flexibly between the launching carriage and the boring machine and may also be received in the recess provided by a key-slot 119 in the bore-wall and in which a key on the machine may ride, as is described in the application above referred to.

Figure 12:
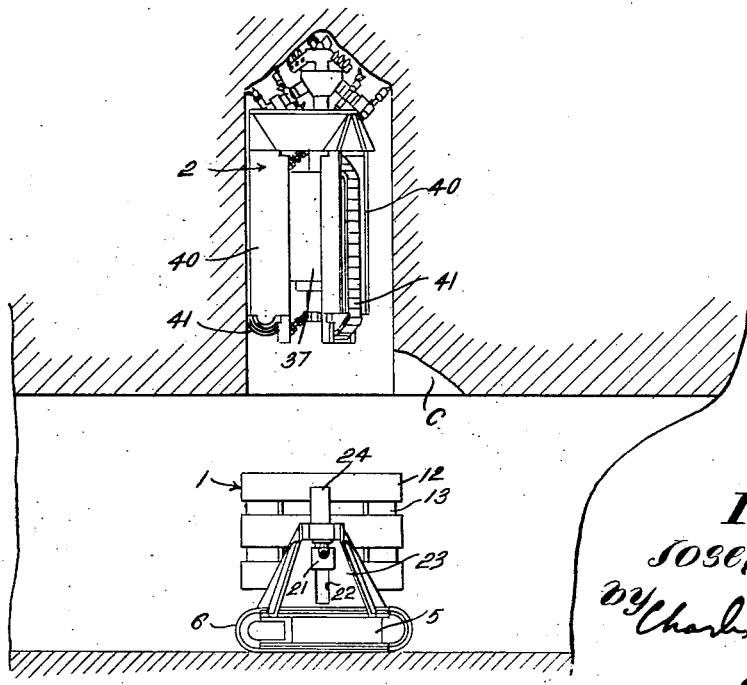
Fig. 12 is a schematic view showing the machine-guide of the carriage swung into a vertical position and with the boring machine in vertical shaft-driving position above the carriage.

The general mode of operation of the improved boring machine is as follows: The boring machine 2 may be transported from place to place about the mine by the self-propelled launching carriage 1, and when the working place is reached the launching frame 12 of the carriage may be elevated and tilted to direct the boring machine from the carriage in the desired direction. Usually the boring machine is launched toward the face just above the mine floor, as shown in Fig. 8, and as the machine travels forwardly to form the bore in which it is received, it may move downwardly at a slight inclination to bring the head down to the floor level. The crawler treads 41 of the boring machine engage the inner walls 14 of the frame-liner 13 of the annular guide frame 12, to feed the boring machine forwardly from the launching carriage and as the bore in the vein or other earth formation deepens sufficiently the crawler treads engage the bore-walls to effect feed. In order to effect vertical or inclined launching of the boring machine, the rearward frame portion 55 and the conveyor mechanism carried thereby are detached from the annular guide frame 12 and the cylinders 24 may be operated to elevate the annular guide frame and the latter may then be swung by the motors 32 on its swiveled mounting to bring the same into the desired angular position. Under low headroom, as shown in Fig. 12, the boring machine, as the frame is swung from horizontal to vertical position, may cut into the roof slightly as indicated at C to permit the machine to assume its vertical position, and then the boring machine may be fed upwardly by its crawler treads from the guide frame of the launching carriage into the bore hole. During angular or vertical boring, the disintegrated material may be discharged from the machine by gravity and any conventional form of conveying means such as a shaker belt conveyor may be suspended from guides from the roof or otherwise supported to receive the disintegrated material discharged from the bore hole, or if desired the material may be discharged by gravity downwardly from the bore hole directly onto the mine floor and thereafter be loaded out in a suitable manner.

During the operation of the machine while effecting the formation of a substantially horizontal bore, the launching carriage may remain in the main entry or other mine passageway and the shaker belt 57 may be extended from its winding drum 56 by the advance of the boring machine and as the machine advances, the disintegrated material discharged from the boring machine is continuously conveyed from the machine rearwardly through the bore to discharge on another conveyor or other conventional means of transportation located in the main entry, or other mine passageway. The usual power and water lines 121 and 122 connected to the machine may follow the machine into the bore and the key slot 119 provided by the machine and in which the machine is keyed may receive such power and water lines as the machine advances. When the machine is advanced the desired distance in the mine vein or other earth formation, the crawler treads may be reversed and the machine may be retracted in the bore, and the power and water lines move out of the key slot as the machine retreats. The curved walls of the bore provided by the machine substantially eliminate any need for roof props, roof anchors or other roof supporting means. The machine operator may ride in a prone position on a platform P arranged longitudinally within the machine at one side of the machine frame and the operator while substantially protected may readily control the functions of the machine and observe the operating characteristics of the boring head. In case a bit change or other adjustments are necessary at the front of the machine the latter may be retracted a short distance in the bore and the operator or his helper may crawl forwardly past the head into a position in advance of the head so that bit changes or other adjustments may be conveniently effected. Under conditions where the operator cannot ride on the machine as for example during vertical shaft boring, the machine controls may be located in the main entry on the launching carriage or on a separate truck. Other modes of use and advantages of the machine will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claim.

What I claim as new and desire to secure by Letters Patent is:

In combination, a self-propelled transporting device for a boring machine, a unitary boring machine for boring a hole in an earth formation and receivable on said transporting device for transport thereby, said machine having boring means, driving means therefor and propelling means, extensible conveying means connected between said transporting device and said boring machine for conveying the cuttings from said boring machine as boring progresses, said conveying means comprising a shaker belt reciprocable relative to said transporting device and said boring machine and extending into the bore and moving into the bore with the machine as the latter advances in the bore, means for attaching the free end of said belt to said boring machine, and means for effecting conveying movement of said extended portion of said shaker belt relative to said transporting device and said boring machine including a power device carried by said transporting device, said power device comprising a power driven drum on which said belt is wound, and a reactor mechanism carried by said boring machine embodying a yieldable, compressible member to which the free end of said belt is attached, said drum moving the extended portion of said belt in one direction and said yieldable member of said reactor mechanism moving said extended belt portion in the opposite direction, and means for driving said drum to effect belt movement in said one direction.

References Cited in the file of this patent

UNITED STATES PATENTS

| | | |
|---|---|---|
| 1,501,093 | Blower | July 15, 1924 |
| 2,548,952 | Crossland | Apr. 17, 1951 |
| 2,616,677 | Compton | Nov. 4, 1952 |
| 2,690,252 | Von Stroh | Sept. 28, 1954 |
| 2,699,328 | Alspaugh et al. | Jan. 11, 1955 |
| 2,740,618 | Snyder et al. | Apr. 3, 1956 |